April 22, 1958 W. B. HERNDON 2,831,365
TRANSMISSION CONTROL SYSTEM
Original Filed June 25, 1952 4 Sheets-Sheet 4

Inventor
Walter B. Herndon
By Willits, Helwig & Gallio
Attorneys

United States Patent Office 2,831,365
Patented Apr. 22, 1958

2,831,365

TRANSMISSION CONTROL SYSTEM

Walter B. Herndon, Ann Arbor, Mich., assignor to General Motors Corporation, Detroit, Mich., a corporation of Delaware Continuation of application Serial No. 295,519, June 25, 1952. This application September 2, 1954, Serial No. 453,771

22 Claims. (Cl. 74—472)

This application, is a continuation of my co-pending application Serial No. 295,519, filed June 25, 1952, now abandoned, etntitled Transmission Control System.

This invention relates to controls for change speed gearing transmissions, and in particular to improved controls for such transmissions in motor driven vehicles. It is directed to improvements in control systems of the type wherein independently acting automatic and manual control members cooperate to produce automatic selection of gear ratio in step ratio gearing. It is particularly directed to improvements in the control system as disclosed in my co-pending application for United States Letters Patent, Serial No. 235,213, filed July 5, 1951, now Patent No. 2,790,327.

The invention represents a number of improvements in such control systems whereby a plurality of speed ratio ranges may be selected to meet the particular requirements of different drive conditions encountered in the operation of a motor vehicle.

The invention provides for completely automatic shifting within each range for which the control system is set.

The invention further provides for forced downshift of the gear ratio under control of the vehicle operator in each range of operation for which the control system is set.

An object of this invention is to provide an automatic vehicle transmission and control system therefor constructed and arranged to be operated in any one of a plurality of gear ratio ranges as selected by the vehicle operator, in which each gear ratio range includes at least two gear ratios and provides for automatic shift of gear ratio in the range selected by the vehicle operator.

Another object of this invention is to provide an automatic vehicle transmission and control system constructed and arranged to be operated in any one of a plurality of drive ratio ranges, one of said ranges providing for two forward drive ratios, the second of said drive ranges providing for three forward drive ratios, and the third of said ranges providing for four forward drive ratios, and providing for automatic shift of drive ratio in the range selected by the operator.

An additional object of this invention is to provide in a control system for a transmission having a planetary gearing unit and having a pair of fluid pressure responsive servo members operable to establish different drive ratios through said gearing unit, a manually operable valve and a shift valve for controlling the servo units constructed and arranged such that the manually operable valve may be positioned to select different drive ranges and wherein the manually operable valve is effective in one position to direct fluid pressure to control one of the servo units and also to control a hydraulically controlled shift valve.

A further object of this invention is to provide in a control system of the class described having a governor for delivering two different governor pressures to a pair of governor pressure delivery passages for controlling the shift valves, an overcontrol valve effective in one position to connect one of said shift valves to one output pressure delivery passage of the governor and effective in a second position to connect said one shift valve to the other output pressure delivery passage of said governor.

Another object of this invention is to provide in a control system of the class described, a servo member having a plurality of pressure control chambers wherein fluid pressure is supplied to apply the servo member, and having a control chamber wherein fluid pressure is supplied to release the servo member, and including an overrun control valve normally biased to admit pressure to one of said apply control chambers and responsive to pressure supplied to the release control chambers to connect said one apply chamber to exhaust.

A further object of this invention is to provide in a control system for a step-gear planetary transmission of the class described and having first and second servo units for establishing different transmission drive ratios, a pair of control chambers in one servo unit to which fluid pressure is directed to establish one drive ratio, a control chamber in each of the servo units to which pressure fluid is directed to establish a second drive ratio, and a valve responsive to fluid pressure directed to the last-mentioned chambers for releasing the fluid pressure from one of the chambers of the first servo unit.

Still another object is to provide in a control system of the class described, the combination of: a first servo for establishing one drive condition through a planetary gearing unti, a second servo for establishing a second drive condition through the planetary gearing unit, a fluid pressure source, a speed responsive governor for delivering variable governor pressure to a pair of governor pressure delivery passages, means including a manually operable valve and a hydraulically controlled shift valve for controlling the drive ratio of the planetary gearing unit, a pair of control chambers in one of said servo units to which fluid pressure is supplied from said manually operable valve to establish one drive ratio, a fluid pressure chamber in each of said servos to which fluid is supplied by said shift valve to establish a different drive ratio, a valve yieldably biased to one position to connect one of the governor delivery passages to the shift valve and responsive to pressure in said governor delivery passage to connect the other of said governor pressure delivery passages to the shift valve, a control chamber associated with said shift valve and adapted to be supplied with fluid pressure in one operative position of said manually operable valve, and a valve responsive to pressure supplied to a chamber of each of said servos by the shift valve for connecting one of the chambers of one of said servos to exhaust.

These and other objects and advantages of this invention will be apparent from the following description and claims taken in conjunction with the accompanying drawings in which:

The transmission for which this control system is designed is of the step ratio type as shown in the patent to Oliver K. Kelley, 2,221,223, filed April 10, 1939, issued August 13, 1940, incorporating three planetary gearing units, each unit having a band adapted to be applied to a drum for reduction gear ratio and two of the units having a clutch adapted to be engaged for direct drive through each of the planetary units. The transmission is adapted to provide neutral, four gear ratios and reverse as follows:

Neutral—all bands and clutches released
Low—the front band and rear band are applied
Second—the front clutch and rear band are applied
Third—the front clutch and rear band are applied
Fourth—the front clutch and rear clutch are applied
Reverse—the front unit band and reverse unit brake are applied All of the servo units are applied through the admission of fluid pressure with the exception of the rear band unit which is spring biased for application and released through the action of fluid pressure.

Figure 1:
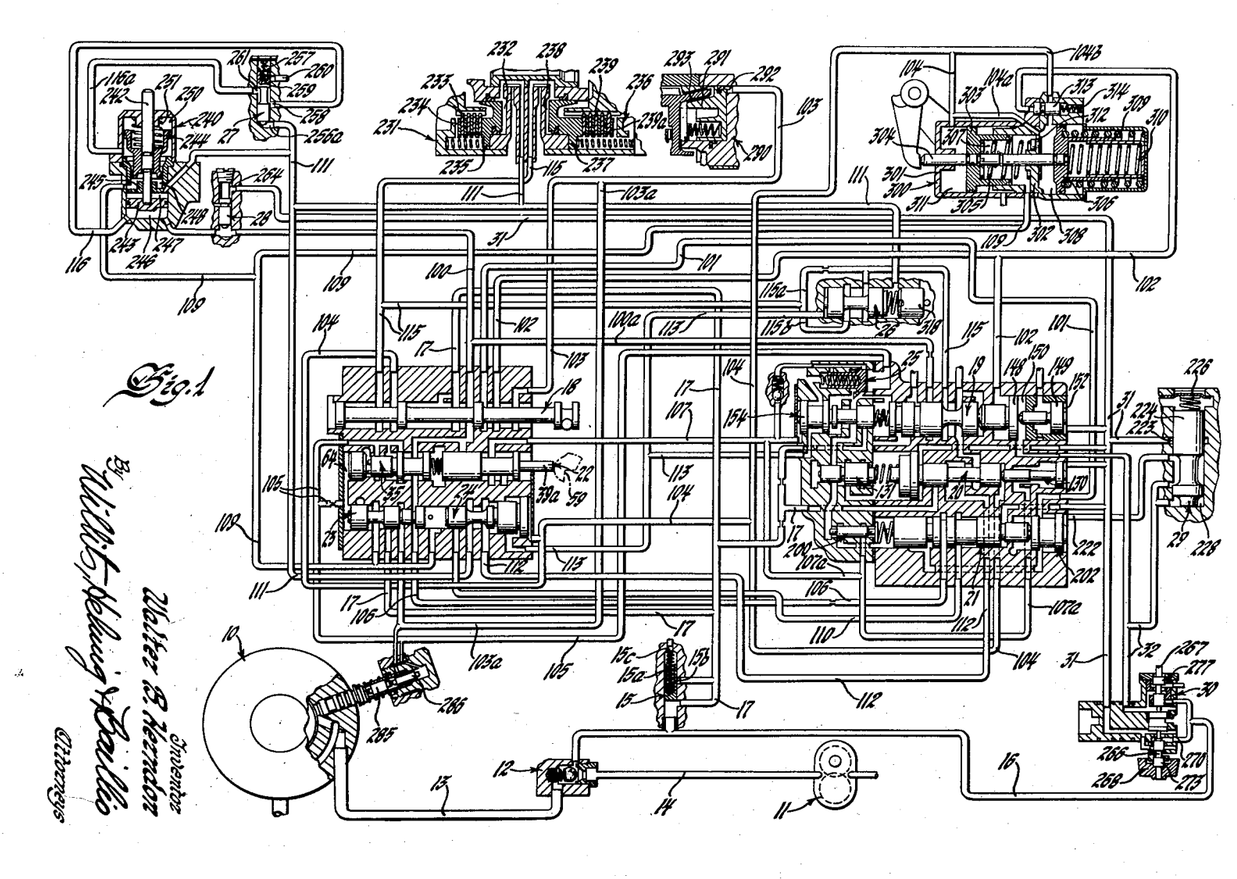
Figure 1 is a schematic diagram of the control system.

Referring to Figure 1, there is shown an engine driven pump 10 and a vehicle tailshaft driven pump 11 responsive to vehicle speed for supplying fluid pressure to the control system. A check valve 12 is disposed between the front pump delivery passage 13 and the rear pump delivery passage 14 to block off the rear pump from the front pump when the rear pump is inoperative. A valve 15 disposed in the common supply passage 16 leading from check valve 12 is effective in one position to admit line pressure to supply passage 17 and effective in a second position to connect said supply passage to exhaust. In the event that pressure in passage 17 drops below a predetermined pressure level, stem 15a will uncover port 15b to connect passage 17 to exhaust through port 15c. A manually operable valve 18 may be positioned to select neutral, a four speed drive range, a three speed drive range, a low or two speed drive range and reverse. These drive ranges are hereafter referred to as drive range-4, drive range-3, low, or reverse. The various effective positions of valve 18 for selecting such drive ranges are indicated as N, DR-4, DR-3, Lo and R on Figure 2.

Figures 2, 4:
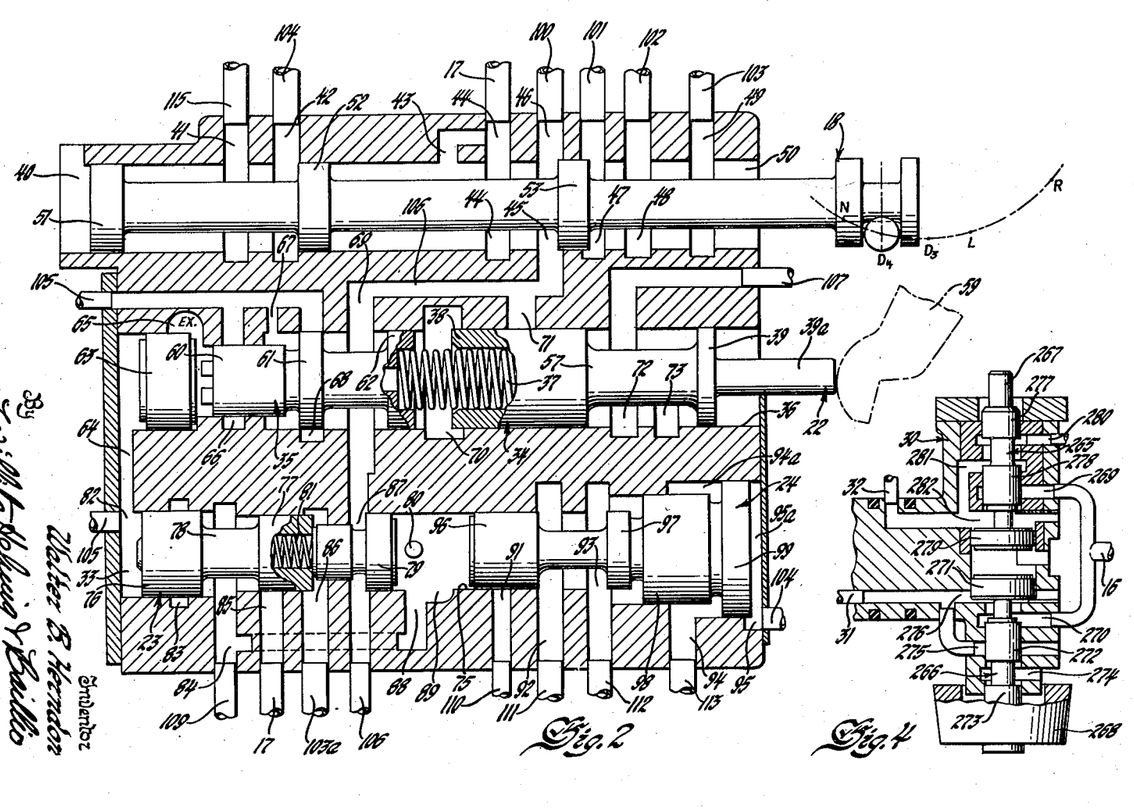
Figure 2 is an enlarged schematic diagram of a group of valves shown at the left hand portion of Figure 1.
Figure 4 is an enlarged schematic diagram of the governor.

With the valve 18 positioned for drive range-4, the transmission is permitted to upshift through four gear ratios. With the valve 18 positioned for drive range-3, upshift from third to fourth gear is prevented up to vehicle speeds of approximately 75 miles per hour. With the valve 18 positioned for low range of operation, the transmission is prevented from upshifting beyond second gear ratio. With the valve 18 positioned for reverse, no upshifting in the transmission is possible.

The transmission shown in Patent 2,221,233 and in my co-pending application Serial No. 235,213, filed July 5, 1951, now Patent No. 2,790,327 is provided with a pair of planetary gearing units adapted to be operated by means of various brake and clutch actuating servos which may be similar to the servos to be controlled by the control system of the present invention. Accordingly, no detailed description of the transmission gearing units is deemed necessary to the present disclosure.

The control system for actuating the various brake and clutch servos to select the transmission gear ratio, shown in Figure 1, includes a manually operable valve 18, shift valves 19, 20 and 21, a throttle valve 22, a compensator valve 23, a double transition valve 24, a throttle valve regulator valve 25, a timing valve 26, a front servo unit overrun control valve 27, a front unit servo restrictor valve 28, a third to fourth speed overcontrol valve 29 and a line exhaust valve 15.

A governor 30, which may be rotated by the vehicle tailshaft, not shown, and responsive to vehicle speed, provides two pressure level outputs, termed G-1 and G-2, to passages 31 and 32 respectively for exerting force tending to upshift the shift valves 19, 20 and 21. Governor pressure delivery passage 31 is connected to a chamber 264 of a fourth to third speed restrictor valve 28, to a chamber 152 of a governor plug 149 associated with the third to fourth speed shift valve 19, to a port 223 of a third to fourth speed overcontrol valve 29, to a chamber 139a (see Figure 3) associated with the first to second shift valve 20, to a chamber 139 of a governor plug 130 (see Figure 3) associated with shift valve 20, and to a chamber 220 of a third to fourth speed shift valve 21 (see Figure 3).

Governor pressure delivery passage 32 is connected to ports 225 and 230 of overcontrol valve 29 (see Figure 7) and to a chamber 150 associated with a governor plug 148 associated with shift valve 19 (see Figure 1).

Governor 30, shown in detail in Figure 4, is made up of a pair of governor valves 265 and 266, which are alike except for the masses of the calibrating weights 267 and 268, and operate as described in the United States Letters Patent to Earl A. Thompson 2,204,872, issued June 18, 1940, and shown in Figure 5 of that patent. The governor may be driven by the vehicle output shaft so as to be responsive to vehicle speed or may be driven proportional to engine speed. It is preferred that the governor be driven such that it is responsive to vehicle speed to provide a variable output pressure which increases with increase of vehicle speed.

The governor 30 is provided with a pair of pressure supply ports 269 and 270 supplied with pump line pressure by a passage 16. Passages 31 and 32 are governor pressure delivery passages. Valve 266 which controls the governor delivered pressure in passage 31 is made up of lands 271, 272 and 273, and is provided with an exhaust port 274, a governor pressure delivery port 275 and a port 276 for permitting governor pressure in passage 31 to react upon land 271. A relatively heavy weight 268 is secured to land 273.

Valve 265 which controls the pressure in passage 32 is made up of lands 277, 278 and 279, there being a relatively light weight 267 secured to land 277. The valve 265 is provided with an exhaust port 280, pressure delivery port 281 and a port 282 for permitting governor pressure in passage 32 to react upon land 279.

In operation, due to the difference in the masses of weights 267 and 268, governor delivered pressure will build up in passage 31 at a more rapid rate than the rate at which governor delivered pressure is built up in passage 32.

The throttle valve 22, controlled by the vehicle accelerator pedal, is operative in one range of operation to deliver a variable fluid pressure to one end of the compensator valve 23 to the throttle valve regulator valve 25, to a detent plug 154 associated with the second to third shift valve 19 and to the regulator plugs 131 and 200 associated with the first to second and third to fourth shift valves 20 and 21 respectively, such throttle valve pressure tending to downshift the valves in opposition to the governor pressure tending to upshift the valves.

The compensator valve 23 delivers pressure to a chamber 307 of the rear band servo unit 300 and to a chamber 248 of the front band servo unit 240, this pressure tending to assist in the application of the rear unit band servo 300 and to assist in the application of the front unit band servo 240. This compensator pressure, which varies in accordance with fluctuations in the pressure delivered by throttle valve 22, is also directed to one end of the double transition valve 24 to yieldably bias the valve 24 to its bottom position illustrated in Figure 1. Pump line pressure in passage 17 is constantly directed to a pressure supply port 85 (see Figure 2) of the compensator valve 23, to the pressure supply port 44 (see Figure 2) associated with the manually operable valve 18, to a pressure supply port 169 (see Figure 3) associated with the third to second detent plug 154, to a pressure supply port 127a (see Figure 3) of the first to second shift valve 20 and to a pressure supply port 217 (see Figure 3) of the third to fourth shift valve 21 by way of passage 106 whenever the manually operable valve is positioned for any drive condition of transmission operation.

In operation, the valve 18 may be positioned for neutral, four speed drive range, three speed drive range, low or second speed drive range, and reverse condition of operation.

Manually operated valve

Details of the manually operated valve are shown in Figure 2, the manually operated valve 18 being illustrated in its four speed drive range position. The valve 18 may be positioned in the various selected positions heretofore stated by means of any suitable control linkage (not shown) leading from the vehicle steering column to the valve so that the vehicle operator may select the drive range condition of operation of the transmission. As shown in Figure 2, valve 18 is provided with 11 ports, these ports being numbered from left to right are, exhaust port 40, port 41 communicating with the rear clutch apply passage 115, port 42 communicating with the rear band release passage 104, pressure supply ports 43 and 44 each communicating with main line pressure supply passage 17, port 45 for directing line pressure to the throttle valve 22, supply port 69, and to the pressure supply port 217 of the third to fourth shift valve 21 by way of passage 106, port 46 connected to passage 100 leading to a control chamber 246 of a front unit servo 240 and to a pressure supply port 177 of the second to third speed shift valve 19, port 47 connected by passage 101 to a control chamber 202a of the third to fourth speed shift valve 21, regulator plug 202 and to control chamber 215 of shift valve 21, port 48 connected by passage 102 to one end of the rear brake servo auxiliary exhaust valve 313 and to a chamber 182 of a governor plug 148 associated with the second to third speed shift valve 19, port 49 connected by passage 103 to the reverse brake servo unit control chamber 292, to port 86 at one end of the compensator valve 23 and to a pressure control valve plug 285 associated with the engine driven pump, and port 50 connected to exhaust.

The body of valve 18 is provided with lands 51, 52 and 53 adapted to cooperate with the various ports, depending upon the position of the valve body within the valve bore.

With the valve 18 positioned for the four speed drive range condition of transmission operation, as shown in Figure 2, land 51 blocks off exahust port 40, land 53 blocks off exhaust port 50 from passage 17, and land 52 blocks off passage 104. Line pressure from main line supply passage 17 is admitted to front band apply passage 100 by way of ports 44 and 46. A branch passage 100a (see Figure 1) leading off of front band apply passage 100 conducts pump line pressure to supply port 177 (see Figure 3) associated with the second to third shift valve 19. Line pressure is likewise admitted from port 45 of valve 18 to ports 71 and 69 of the throttle valve 22 and to a pressure supply port 217 associated with the third to fourth shift valve 21 by way of passage 106 (see Figure 3). Passages 101, 102 and 103 are exhausted to sump by way of port 50 of the manually operable valve.

Figure 3:
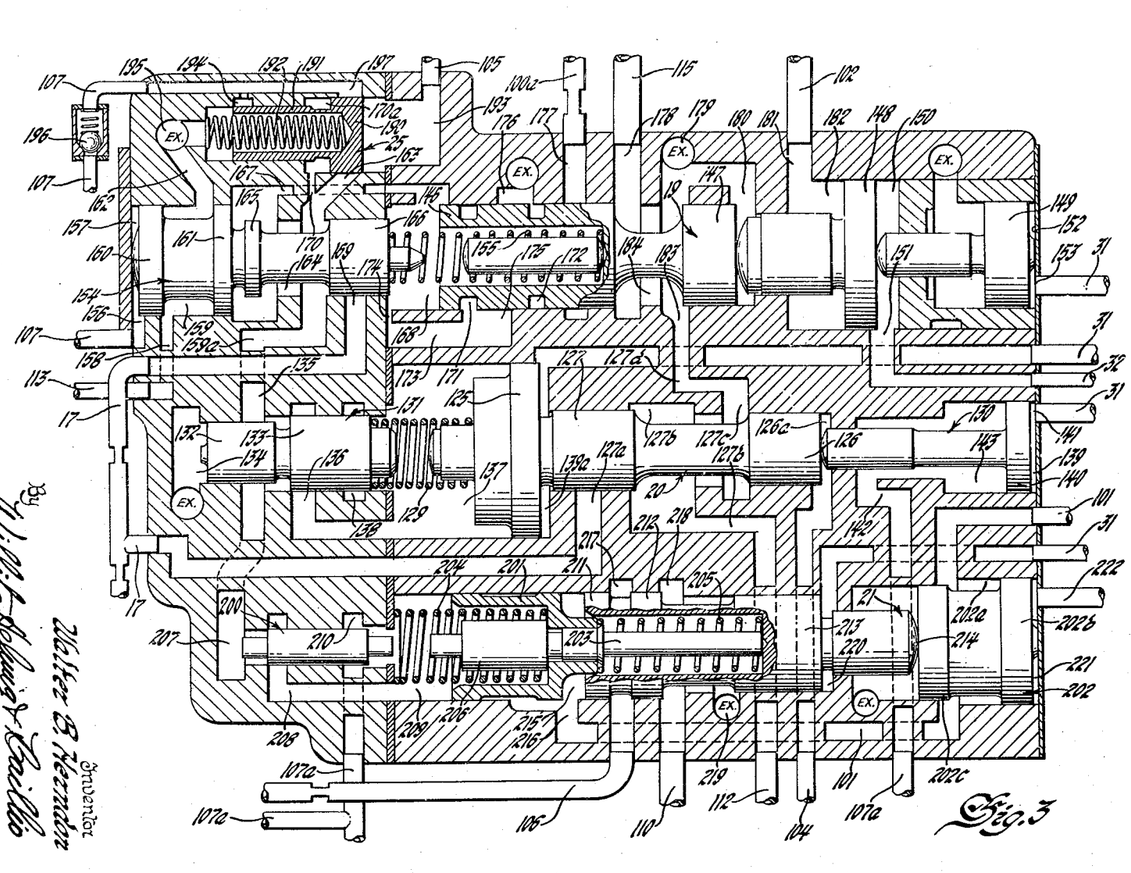
Figure 3 is an enlarged schematic diagram of a group of valves shown in the right hand portion of Figure 1.

With the valve 18 positioned for third speed drive range of operation, or intermediate range operation, the action is similar to that heretofore described with the exception that pressure from line pressure supply passage 17 is admitted through ports 44 and 47 of valve 18 to passage 101 leading to a control chamber 215 of the third to fourth speed shift valve 21 (see Figure 3). Pressure in passage 101 also acts upon a land 202b of a governor plug 202 associated with shift valve 21 as shown in Figure 3. Passages 102 and 103 remain exhausted to sump through port 50.

In its low range position, manually operable valve 18 is effective to admit line pressure from pressure supply passage 17 to passage 102 by way of ports 44 and 48, the latter passage leading to one end of rear servo auxiliary exhaust valve 313 and to a chamber 182 (see Figure 3) associated with a regulator plug 148 associated with the second to third shift valve 19.

With the valve 18 positioned for reverse operation, land 53 is moved to block off exhaust port 50 and to admit line pressure from pressure supply passage 17 to reverse brake apply passage 103 by way of ports 44 and 49. A branch passage 103a (see Figure 1) leading from reverse brake apply passage 103 conducts line pressure to a port 86 (see Figure 2) at one end of the compensator valve 23 and to a pressure regulator plug 285 (see Figure 1) associated with the engine driven pump.

With the manually operable valve 18 positioned for neutral, land 53 is effective to connect passage 100 to exhaust port 50, and land 52 is effective to admit pressure to passage 104 by way of ports 43 and 42. Passage 104 conducts line pressure to a chamber 95a (see (Figure 2) at one end of double transition valve 24, to chambers 311 and 308 of the rear band servo 300, and to a chamber 126a (see Figure 3) beneath the first to second speed shift valve 20. With the front band servo exhausted and with line pressure supplied to the rear brake servo 300 to release the rear servo brake, the transmission is in neutral.

By placing valve 18 in neutral, port 45 and pressure supply passage 106 are connected to exhaust port 50 of valve 18 so that no pressure is supplied to the pressure supply port 217 of the third to fourth speed shift valve 21 by way of passage 106.

Throttle valve

The throttle valve 22, illustrated in detail in Figure 2, is actuated by a control linkage from the accelerator pedal (not shown) by a cam 59 effective to move the valve within the valve bore when the accelerator pedal is depressed. The throttle valve 22 is a pressure metering valve effective to deliver a variable fluid pressure which increases as the accelerator pedal is depressed, to a throttle valve pressure delivery passage 105. The throttle valve pressure in passage 105 is delivered to a port 64 at one end of a throttle valve detent plug 63, to a chamber 33 at one end of compensator valve 23, and to a pressure regulator plug 286 (see Figure 1) associated with the engine driven pump and to a chamber 193 (see Figure 3) at one end of throttle valve regulator valve 25.

The throttle valve 22 is formed of two sections 34 and 35 positioned in a bore 36 for sliding movement. A spring 37 is interposed between sections 34 and 35, being operative to permit relative motion of the two sections with respect to each other. Section 34 includes lands 38 and 39 joined by a reduced stem portion, and a stem 39a protruding outwardly from an end of the bore to contact an operating cam 59 which may be operated by control linkage connected to the vehicle accelerator pedal (not shown). Section 35 includes lands 60, 61 and 62, the land 61 being of greater diameter than the land 60. The detent plug 63 is positioned at one end of section 35, being reacted upon by pressure delivered by the valve section 35. The valve bore is provided with ports 64, 65, 66, 67, 68, 69, 70, 71, 72 and 73. Port 64 connects one end of the detent plug 63 to throttle valve delivery passage 105. Port 65 exhausts to sump. Port 66 connects the throttle pressure delivery passage 105 to the valve bore adjacent land 60. Port 67 connects the throttle valve delivery passage 105 to the space between lands 60 and 61. Port 68 connects the throttle valve pressure delivery passage 105 to the valve bore. Ports 69 and 71 connect to line pressure supply passage 106 controlled by the manual valve 18. Port 70 exhausts to sump. Port 71 connects the valve bore to line pressure supply passage 106. Port 72 connects to a forced downshift passage 107 leading to a chamber 157 (see Figure 3) adjacent one end of the third to second detent plug 154, to a port 197 (see Figure 3) of the throttle valve regulator valve 25 through a check valve 196, to branch passage 107a leading to port 210 (see Figure 3) of a third to fourth shift valve regulator plug 200 and to a chamber 143 associated with a second to first speed governor plug 140. Port 73 exhausts to the transmission sump.

As the vehicle accelerator pedal (not shown) is depressed to open the vehicle engine throttle, cam 59 forces section 34 into the valve bore, thereby compressing spring 37 and tending to move section 35 into the bore. Pressure delivered by throttle valve delivery passage 105 reacts upon the land 61 and the detent plug 63, tending to force section 35 to compress spring 37 so that land 61 will restrict the fluid delivered to passage 105 through port 68. The pressure level of the throttle valve pressure therefor increases as the cam 59 forces section 34 into the bore and decreases as the section 34 is permitted to move out of the bore.

*Compensator valve*

The compensator valve 23, shown in detail in Figure 2, is used to supply a metered pressure to a compensator pressure delivery passage 109 as determined by the pressure level of pressure fluid delivered to throttle valve delivery passage 105. This metered compensator pressure is delivered by passage 109 through a port 88 to a chamber 89 adjacent one end of double transition valve 24, to a chamber 248 (see Figure 1) associated with the front band servo 240 and to a chamber 307 associated with the rear band servo 300. This metered compensator pressure, which increases when the throttle valve pressure in passage 105 increases, acts to assist in the application of the front and rear band servos to prevent slippage of the bands when high torque is being transferred through the transmission.

The compensator valve body 23 is slidably positioned in valve bore 75, the body being made up of lands 76 and 77 joined by a reduced stem section 78. Land 76 is of greater diameter than that of land 77. A compensator regulator plug 79 in bore 75 bottoms upon a pin 80, there being a spring 81 disposed between one end of the compensator valve 23 and the adjacent end of the compensator regulator plug 79. The spring 81 normally urges the compensator valve body and the regulator plug 79 into spaced relationship with respect to each other. The valve bore is provided with ports 82, 83, 84, 85, 86, 87 and 88 operatively associated with the compensator valve and the compensator regulator plug. Port 82 admits throttle valve pressure to one end of the compensator valve, this throttle valve pressure from passage 105 acting to urge the compensator valve toward the compensator regulator plug 79 and tending to compress spring 81. Port 83 is an exhaust port leading to the transmission sump. Port 84 is the compensator valve delivery port whereby variable metered pressure is admitted to compensator pressure delivery passage 109. Port 85 is a pressure supply port to the compensator valve 23 connecting the valve bore to main line pressure supply passage 17. Port 86 connects to reverse brake apply passage 103a so that main line pressure is admitted behind land 77 of the compensator valve 23 whenever the manually operated valve 18 is placed in its reverse position. This line pressure from passage 103a acting behind land 77 of the compensator valve 23 will be effective to cause the compensator valve 23 to move to the left and exhaust all compensator pressure through port 83, irrespective of the effect of the throttle valve pressure acting on the end of land 76, when the manually operable valve 18 is placed in reverse. The throttle valve pressure from passage 105 acting on the end of land 76 of the compensator valve 23 will, however, be effective in all forward speed ratios to cause the compensator valve to meter a variable compensator pressure to compensator delivery passage 109. It is only when reverse is selected that the compensator valve 23 is disabled and caused to exhaust all compensator pressure. Port 87 permits line pressure from passage 106 to act upon land 79 of the compensator plug and to pass through the compensator plug to the portion of passage 106 leading to pressure supply port 217 (see Figure 3) of the third to fourth shift valve 21. It will be noted that the compensator valve 23 is made up of lands 76 and 77 having different areas so that the pressure delivered to passage 109 is effective to counteract the effect of throttle valve pressure acting upon land 77, to provide a variable pressure in passage 109 as determined by the pressure in passage 105. Port 88 communicates with compensator pressure delivery passage 109 and is effective to admit compensator pressure to chamber 89 behind land 79 of the compensator plug. This compensator pressure acting in chamber 89 tends to move the compensator plug 79 against spring 81 and also acts upon one end of land 96 of the double transition valve 24, tending to position the double transition valve in its right hand position.

*Double transition valve*

Positioned in the same bore and in alignment with the compensator valve 23 is a double transition valve 24. This valve is positioned in its right hand position, illustrated in Figure 2, for first and second gear ratio operation and is moved leftwardly toward pin 80 for third and fourth gear ratio operation. In addition to port 88 heretofore described, there are five ports 91, 92, 93, 94 and 95 associated with the double transition valve. Port 91 connects the valve bore to a passage 110 leading to a port 218 (see Figure 3) of the third to fourth shift valve 21. Port 92 communicates with a passage 111 through which passage line pressure is supplied to the front servo unit clutch for applying the clutch, to the front band for releasing the band, to a chamber 256a (see Figure 1) beneath an overrun control valve 27, and to a chamber 322 (see Figure 6) of a timing valve 26. Port 93 connects to a passage 112 leading to a port 127b (see Figure 3) of the first to second shift valve 20, the passage 112 being exhausted through a passage 127d and exhaust port 179 of the second to third shift valve 19 whenever the transmission is in first gear ratio.

Port 94 connects chamber 94a of the valve 24 to a passage 113 connected to a port 158 (see Figure 3) of the third to second speed detent plug 154 and connected to a chamber 315a (see Figure 6) of a timing valve 26. Port 95 connects a chamber 95a of the valve 24 to a passage 104 leading to chambers 311 and 308 (see Figure 1) of the rear unit band servo 300, to chamber 126a (see Figure 3) beneath the first to second speed shift valve 20, and to port 42 (see Figure 2) of the manually operable valve 18. Whenever line pressure is admitted to passage 104 to release the rear band servo, this pressure acts upon a land 99 of the double transition valve 24 to move the valve to connect port 91 to port 92.

The valve 24 is made up of lands 96, 97, 98 and 99, the lands 96 and 97 being of the same diameter, land 98 being of a larger diameter than land 97, and land 99 being of greater diameter than any of the other lands of the valve. Pressure admitted from passage 113 to port 94 acts upon land 99, tending to position the valve 24 to connect ports 92 and 93.

*First to second speed shift valve assembly*

Referring to Figure 3, a first to second speed control shift valve 20 is made up of a piston 125, land 127 and land 126 all joined together to move as a unit. A spring 129 yieldably urges the shift valve 20 to its first speed position illustrated in Figure 3. A detent plug 130 is positioned in a bore to the right of the shift valve to act upon the land 126 of shift valve 20 as hereafter more particularly explained. At the opposite end of the shift valve from detent plug 130 there is shown a first to second speed regulator plug 131 in a bore in alignment with the shift valve. A spring 129 acts at one end upon the shift valve piston 125 and at the other end upon the land 133 of the first to second speed regulator plug 131. Regulator plug 131 includes a pair of lands 132 and 133 of different area. Port 134 at the end of land 132 of the first to second speed regulator plug 131 exhausts to sump. Port 135 admits throttle valve pressure from a passage 159a to act upon land 133 of the regulator plug, tending to move the plug against spring 129 and admits throttle valve pressure to one end of a third to fourth regulator plug 200 through a passage 207. A port 136 controlled by land 133 of regulator plug 131 is connected to a chamber 137 at one side of the large piston 125 of the first to second speed shift valve 20. Port 138 exhausts to the transmission sump. When throttle valve pressure acting upon the end of land 133 of regulator plug 131 is sufficiently great, the regulator plug 131 is moved against spring 129 far enough to admit pressure from passage 159a to the chamber 137. The regulator plug 131 acts as a pressure limiting valve for limiting the pressure level of fluid pressure existing in chamber 137. More specifically, the land 133 of the regulator plug 131 hunts between positions wherein fluid pressure is admitted to chamber 137 through port 136 and wherein pressure in chamber 137 reacting upon the regulator plug causes the plug to block off port 136 and open exhaust port 138. Thus the pressure level maintained in chamber 137 is less than the pressure level of fluid existing in throttle valve pressure supply passage 159a. The pressure in chamber 137, termed a modulated throttle valve pressure, is less than the pressure existing in passage 159a by reason of the action of spring 129 tending to move the regulator plug to cut off port 136 and open exhaust port 138. The detent plug 130 at the opposite end of the shift valve is supplied with governor delivered pressure from passage 31 to a chamber 139 beneath land 140 by way of port 141. Port 142 connects chamber 143 at the opposite side of land 140 of the detent plug 130 to passage 107a branched off of passage 107 and controlled by the throttle valve 22. When the throttle valve 22 is depressed fully, line pressure from passage 106 is admitted to passage 107 and passage 107a through ports 71 and 72 of valve 22 and to chamber 143 of detent plug 130 to move the detent plug, this pressure acting on land 140 being effective at relatively low vehicle speeds to overcome the effect of governor pressure in chamber 139 to force the shift valve to its first speed position. This provides for forced downshift from second to first speeds at low vehicle speeds.

*Second to third shift speed shift valve assembly*

The second to third speed shift valve 19, shown in detail in Figure 3, is made up of lands 146 and 147 joined by reduced stem portion. A governor plug 148 is positioned in a bore coaxial with that in which the shift valve is positioned, the governor plug being effective to act upon land 147 of the second to third speed shift valve to tend to move the shift valve from its second speed position, illustrated, to its third speed position. To the right of the governor plug 148 a second governor plug 149 of smaller diameter than that of plug 148 is positioned. Governor plug 148 is acted upon by governor delivered pressure from passage 32, the pressure being admitted to chamber 150 behind the governor plug 148 by way of port 151. The governor plug 149 is acted upon by a second governor delivered pressure from passage 31, the second delivered governor pressure being admitted to chamber 152 behind governor plug 149 by way of port 153. At the opposite end of shift valve 19 there is provided a so-called detent plug 154 positioned for movement with respect to the shift valve and adapted to exert a force upon the shift valve through a spring 155. There are seven ports 156, 158, 162, 163, 167, 169 and 170 associated with the third to second speed detent plug 154. Port 156 connects a chamber 157 at the end of the detent plug 154 to a forced downshift passage 107 controlled by the throttle valve 22. Port 158 connects a chamber 159 between lands 160 and 161 of the detent plug 154 to a passage 113 leading to a chamber 315a (see Figure 6) at one end of the timing valve 26 and to chamber 94a (see Figure 2) associated with the double transition valve 24. Port 162 exhausts to the transmission sump. Port 163 admits throttle valve pressure from chamber 193 of the throttle valve regulator valve 25 to chamber 164 between lands 165 and 166 of the detent plug 154 and to a throttle valve pressure delivery passage 159a whenever the throttle valve pressure is of such magnitude to move the throttle valve regulator valve 25 against the spring 192 associated with the latter mentioned valve. Port 167 leads to a chamber 168 at one end of the second to third speed shift valve 19, the pressure in chamber 164 being effective to react upon land 161 of the detent plug 154 and the pressure in chamber 168 being effective to act upon one end of the shift valve land 146 to yieldably urge the shift valve and detent plug into spaced relationship with respect to each other and to bias the shift valve toward its second speed position. Port 169 connects the detent plug bore to the pump line pressure supply passage 17. Port 170 admits pressure from chamber 164 to a chamber 170a associated with the throttle valve pressure control valve 25, this pressure acting upon a land 190 of valve 25 tending to move the valve to block off port 163 and to connect port 194 to exhaust port 195.

Land 146 of the second to third speed shift valve 19 is provided with a pair of annular recesses 171 and 172. A passage 173 connected to chamber 168 through a restriction 174 admits throttle valve pressure from chamber 168 to a chamber 175 at one side of land 146 of the second to third speed shift valve 19. The chamber 175 at the side of land 146 is connected to an exhaust port 176 by recess 172 when the shift valve 19 is moved to its second speed position. This exhaust connection to port 176 has the result of decreasing the pressure level maintained in chamber 168 after the shift valve has moved to its second speed position so that for a given throttle setting and a consequent given pressure level of fluid pressure delivered by the throttle valve, the shift valve will remain in its second speed position until a lower vehicle speed is obtained over that required to cause the shift valve to shift to its second speed position in the first instance. Port 177 of shift valve 19 is connected to the line pressure supply passage 100a. Port 178 connects to the rear clutch apply passage 115. Ports 179 and 180 exhaust to sump. Port 181 connects chamber 182 of governor plug 148 to low range position supply passage 102. Port 183 connects a chamber 184 between lands 146 and 147 to a port 127c of the first to second shift valve 20 by way of passage 127d.

In Figure 3, details of the throttle valve regulator valve 25 are shown. The valve 25 consists of a land 190 having a sleeve 191 formed thereon, the valve being biased by a spring 192 to a position wherein the valve tends to cut off throttle valve pressure supplied to chamber 193 by way of passage 105. Port 163 connects to space 164 between lands 161 and 166 of the third to second detent plug 154. A port 194 in passage 107 is uncovered by sleeve 191 when the throttle valve pressure in chamber 193 falls below a predetermined amount to connect the position of passage 107 above check valve 196 to exhaust port 195. Throttle valve pressure delivered by port 163 of valve 25 to the space 164 between lands 161 and 166 of the detent plug 154 is conducted through a restriction 170 to a chamber 170a adjacent land 190 of valve 25. This pressure acts upon the valve in assistance to spring 192, tending to move the valve to cut off port 163 and open port 194. A check valve 196 in passage 107 prevents the flow of line pressure back through line 107 to the manually operable valve 18, the portion of passage 107 situated between check valve 196 and port 197 of valve 25 being exhausted through exhaust port 195 when throttle valve pressure in chamber 193 drops below a predetermined pressure level.

*Third to fourth speed shift valve assembly*

The third to fourth speed shift valve assembly, shown in detail in Figure 3, is composed of a regulator plug 200, a piston 201, the shift valve 21, and a governor plug 202 disposed in alignment for movement in aligned bores of adequate diameter to carry the members just mentioned. The piston member 201 has affixed thereto an elongated stem 203 which acts as a stop pin bearing upon the shift valve to maintain a spacing between the adjacent ends of the piston and shift valve. Springs 204 and 205 acting upon pistons 201 and shift valve 21, respectively, bias the shift valve 21 toward its third speed position as illustrated in Figure 3. A plug 206 affixed to piston 201 extends in a direction opposite to that of pin 203 carried by piston 201 for the purpose of contacting the regulator plug 200 when the shift valve is moved to its fourth speed position. Throttle valve pressure from port 135 of the first to second speed regulator plug 131 is directed to port 207 at one end of regulator plug 200, tending to move the plug toward spring 204 to uncover a port 208 and to admit throttle valve pressure to a chamber 209 at one side of piston 201. Port 210 is connected to branch 107a of the forced downshift pressure supply passage 107, this passage being exhausted through the exhaust port 73 (see Figure 2) of the throttle valve 22 at all times except when the throttle valve 22 is positioned for forced downshift operation, at which time the exhaust port 73 of the throttle valve is blocked off by land 56 and full line pressure is admitted to passage 107 by way of ports 71 and 72 of the throttle valve. Regulator plug 200 acts to dump pressure from chamber 209 to passage 107a through port 210 when the shift valve 21 is in its fourth speed position. The shift valve 21 is made up of an assembly of three spaced lands 211, 212 and 213, the shift valve having an extension 214 extending from land 213 to contact the governor plug 202. A chamber 215 between the adjacent ends of piston 201 and shift valve land 211 is connected to passage 101 by way of port 216. Passage 101 is controlled by the manually operable valve 18 of Figure 2 and is connected to exhaust through the exhaust port 50 of the manual valve whenever the valve 18 is positioned to select the fourth speed drive range condition of operation. When the valve 18 is positioned to select the third speed drive range of operation, line pressure is admitted to passage 101 and to the chamber 215, this pressure acting upon the piston 201 and land 211 of the shift valve 21 forces the shift valve to its third speed position. Pressure in passage 101 is also admitted to chamber 202a and acts on land 202b of governor plug 202 tending to force plug 202 to its right hand position. Port 218 of the third to fourth speed shift valve 21 is connected to port 91 of the double transition valve 24 of Figure 2 by way of passage 110, the passage 110 being connected to exhaust port 219 of the shift valve 21 whenever the shift valve is in its third speed position. When the shift valve is in its fourth speed position, land 213 blocks off exhaust port 219 and line pressure supply passage 106 is connected to passage 110 by way of ports 217 and 218. The land 212 is of greater diameter than land 213 so that when the shift valve 21 is positioned for fourth speed operation, the shift valve is reacted upon by pressure delivered by the valve, this reaction tending to maintain the valve in the fourth speed position once it has been moved to that position. Governor delivered pressure from passage 31 is admitted to chamber 220 beneath land 213 of shift valve, this governor pressure tending to move the valve from its third speed position to its fourth speed position in opposition to the effect of springs 204 and 205 and throttle valve pressure which tends to move the valve toward its third speed position. Governor pressure from passage 32 is also admitted to chamber 221 beneath the governor plug 202 by way of passage 222, this pressure also tending to upshift the shift valve 21.

Figures 5, 6, 7:
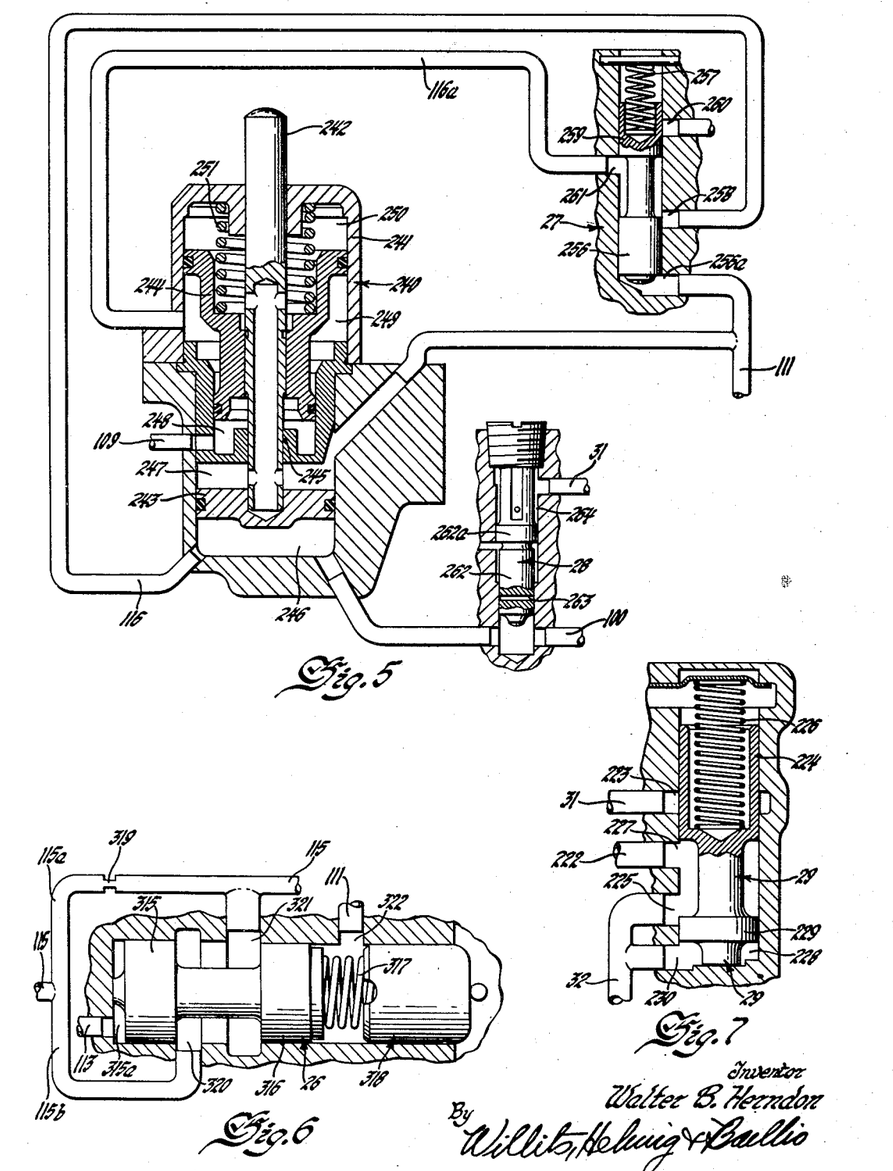
Figure 5 is an enlarged schematic diagram illustrating one of the servos and the overrun control valve of Figure 1.
Figure 6 is an enlarged view of the timing valve of Figure 1.
Figure 7 is an enlarged view of the overcontrol valve of Figure 1.

Referring to Figure 7, it will be noted that a so-called third to fourth speed overcontrol valve 29 is spring biased by a spring 226 to yieldably position the valve to admit governor pressure from passage 32 to chamber 221 (see Figure 3) beneath the governor plug 202 by way of a passage 222. Governor pressure from passage 31 is admitted to a port 223 which is initially blocked off by a land 224 of valve 29. Governor pressure from passage 32 is initially admitted to chamber 221 of the governor plug 202 of Figure 3 by way of ports 225 and 227 and branch passage 222. As the vehicle speed increases, the governor pressure in passage 32 also increases, this pressure being admitted to a chamber 228 beneath a land 229 of valve 29 by a port 230 and acting beneath the land 229 of valve 29 at a relatively high vehicle speed, for instance 75 miles per hour, becomes effective to overcome spring 226 whereupon the valve 29 is moved against the spring 226 to connect port 223 to port 227 and to position valve 29 such that land 229 blocks off port 225. With this condition of operation, the governor pressure from passage 31 is admitted to chamber 221 beneath the governor plug 202 of Figure 3 to cause the shift valve to upshift to its fourth speed position even though the manually operable valve 18 may have been positioned for the third speed drive range condition of transmission operation. The governor pressure existing in passage 31 is of greater magnitude than that existing in governor passage 32 and this greater pressure acting upon the governor plug 202 is effective at such relatively high vehicle speeds to upshift the valve irrespective of the effect of throttle valve pressure in chamber 209, line pressure in chamber 215 and the effect of springs 204 and 205. This is believed to be a novel feature and is of importance in that it protects the vehicle engine against unintentional overspeed operation. It may happen that when the manually operable valve 18 is positioned for the third speed drive range of operation that the vehicle may be operated down a long grade or in open country wherein excessive vehicle speeds may be maintained with relative ease. The vehicle driver may not be conscious of the fact that the transmission is still in third gear with the valve 18 positioned for third speed drive range of operation, and unless a protective measure such as the third to fourth speed overcontrol valve 29 is provided, damage to the engine may result through prolonged operation at high vehicle speeds. The third to fourth overcontrol valve 29 is effective to cause the transmission to upshift to direct drive, thereby preventing excessive engine speed with respect to vehicle speed.

Referring to Figure 5, the details of the front planetary unit brake band actuating servo 240, the overrun control valve 27, and a so-called restrictor valve 28 are shown. The front unit servo 240 consists of a casing 241 having a stem 242 movable with respect to the casing extending outwardly from the casing, the stem having pistons 243 and 244 affixed thereto. Intermediate the two pistons there is a web portion 245 for supporting the stem within the casing, the web portion being fixed to the casing. As shown, the interior portion of the casing is divided into a chamber 246 beneath piston 243, a chamber 247 between web 245 and piston 243, a chamber 248 between the web 245 and a reduced portion of piston 244, a chamber 249 between the casing and externally of piston 244, and a chamber 250 between the end of the casing and piston 244. A spring 251 acting upon piston 244 biases the piston and stem 242 to a position wherein the planetary gearing unit is ineffective to transmit power. The function of the front planetary unit servo 240 is either to apply a band to a drum member (not shown) to establish reduction gearing drive through the front planetary unit or to release the band to prevent any reduction drive through the planetary unit.

In applying the front gearing unit band by means of servo 240, line pressure is admitted to chamber 246 beneath piston 243 by way of ports 44 and 46 (see Figure 2) of manually operable valve 18 and by way of passage 100 leading to chamber 246. A passage 116 leading from chamber 246 and subject to the control of the overrun control valve 27 may admit pump line pressure to chamber 249 of the servo, this pressure acting in assistance to the pressure supplied to chamber 246 to move the stem 242 outwardly against spring 251 and to apply the band. Chamber 248 beneath piston 244 is connected by way of passage 109 to port 84 of the compensator valve 23 (see Figure 2), this compensator pressure acting in assistance to line pressure in chambers 246 and 249 to apply the band. Thus in normal operation, line pressure is admitted to two chambers and a variable compensator pressure which increases as the vehicle throttle is opened, assists the line pressure in maintaining the band applied. The stem 242 is drilled axially and radially to admit pressure from chamber 247 to chamber 250, pressure in chambers 247 and 250 tending to release the band.

In second and fourth speed gear ratios, line pressure is admitted to passage 111, this pressure acting in chambers 247 and 250 being effective in conjunction with the action of spring 251 to release the band. It will be noted that the front band release pressure from passage 111 is also admitted beneath a land 256 of the overrun control valve 27, this pressure being effective to move the overrun control valve against a biasing spring 257 whereupon land 256 blocks off a port 258 and passage 116, and a land 259 is positioned to connect chamber 249 of the front band servo to an exhaust port 260 of the overrun control valve 27 by way of passage 116a and port 261 of valve 27. This operation occurs whenever second or fourth speed gear ratio is selected by the shift valves.

A restrictor valve 28, shown in detail in Figure 5, is made up of a land 262 having a restricting passage 263 drilled therethrough, the land 262 being acted upon by pressure in passage 100, this pressure being normally effective to move the land to the position illustrated wherein free flow of fluid through passage 100 is obtained. A chamber 264 above a land 262a is supplied with governor delivered pressure from passage 31, the governor pressure acting upon the land 262a of greater diameter than land 262 and tending to move the restrictor valve to a position wherein the restricting passage 263 is inserted into line 100. This restrictor valve 28 may be termed a fourth to third speed downshift valve, the valve being effective when shifting from fourth speed to third speed to place the restriction 263 in the line 100. The restriction 263 placed in passage 100 delays the application of the band servo 240, momentarily permitting the vehicle engine to speed up due to the fact that the front planetary unit is ineffective to transmit torque, upon release of the front unit clutch, until the band is applied. This valve functions to permit high torques to be delivered quickly by the engine upon a forced downshift from fourth to third speed gear ratio.

Referring further to Figure 1, there are shown schematically the details of the front planetary gearing unit clutch actuating servo 231, the rear planetary gearing unit clutch actuating servo 236, the reverse brake actuating servo 290, and the rear band actuating servo 300. A piston 235 disposed in a chamber 232 is effective when line pressure is admitted to chamber 232 to apply a series of clutch plates 233 and 234 to establish direct drive through the front planetary gearing unit. Clutch actuating pressure is supplied to servo chamber 232 by way of passage 111. The rear planetary gearing servo clutch is similar to the front unit clutch in that a piston 237 disposed in a chamber 238 is effective when actuated by fluid pressure to engage a series of clutch plates 239 and 239a to establish direct drive in the rear planetary gearing unit. Clutch actuating pressure is supplied to chamber 238 by way of passage 115.

To establish reverse condition of transmission operation, the front unit band servo 240 and a reverse cone brake servo unit 290 are actuated at the same time. The reverse brake servo is made up of a piston 291 disposed in a chamber 292 and actuated by fluid pressure to engage a reverse cone brake 293. Pressure for applying the reverse cone brake is supplied to chamber 292 by way of passage 103.

The rear band servo unit 300 is applied by spring force and is released by fluid pressure supplied to the servo and acting in opposition to the action of springs. The rear band servo is made up of a casing 301 divided into two parts by means of a transversely extending web 302 fixed to the casing. A piston 303 is fixed to a band actuating stem 304 protruding from the casing. Piston 303 is acted upon by a spring 305 which tends to move the stem outwardly from the casing to apply the rear planetary gearing unit band. A second piston 306 disposed in a chamber 308 and affixed to stem 304 is acted upon by a pair of springs 309 and 310 which tend to move the stem 304 outwardly from the casing to apply the rear planetary gearing unit band to establish reduction gearing drive. Pump line pressure is admitted to chambers 311 and 308 by way of passage 104 and branch passage 104a, respectively, this pressure acting upon pistons 303 and 306, respectively, to move the stem inwardly into the casing to release a rear unit servo 300 whenever neutral, second or fourth speeds are desired or called for. Compensator pressure from passage 109 is admitted to a chamber 307 adjacent spring 305, this pressure acting in assistance to the springs to aid in the application of the band for reduction drive. A restriction 312 is placed across the end of branch passage 104a to normally limit the rate at which fluid pressure in chamber 308 may be exhausted from the chamber 308 through passage 104a when the band is being applied. An auxiliary rear servo unit exhaust valve 313 is spring biased by a spring 314 to block off an auxiliary fluid pressure discharge passage 104b leading from chamber 308. This auxiliary fluid pressure discharge passage is of greater diameter than the restriction 312. When the manually operable valve 18 is positioned to select low range condition of operation, pump line pressure is admitted to the end of valve 313 by way of passage 102, this pressure being effective to move the valve against spring 314 to establish communication from chamber 308 to exhaust through passage 104b. This valve permits a rapid exhaust of fluid pressure from chamber 308 so that the band will be quickly engaged by action of the springs. By reason of the operation of this valve, it is possible to rock the car out of a rut by quickly manipulating the manually operable valve between its low range position and its reverse position of operation. In the absence of the auxiliary rear unit servo exhaust valve 313, the time required to exhaust pressure from chamber 308 is such that the momentum of the car would be dissipated before the low unit band could engage and thus it would be impossible to rock the car.

*Timing valve*

Referring to Figure 6, there is shown a timing valve 26, the function of which is to delay the application of the rear band until the front clutch is first applied during a forced downshift from third gear to second gear. It will be remembered that drive in third gear is established by applying the front planetary gearing unit band for reduction drive in the front unit and by applying the rear unit clutch for direct drive through the rear unit. Drive in second gear ratio is established by applying the front planetary gearing unit clutch for direct drive in the front unit and by applying the rear planetary unit band for reduction drive through the rear unit. The timing valve 26 is composed of a pair of lands 315 and 316 joined by a reduced stem portion, the valve being biased to the position illustrated by means of a spring 317 bearing upon a fixed plug 318 in the valve casing. When operating in third speed, pressure is supplied to the rear unit clutch by way of passage 115. A branch of passage 115 is, in turn, split into two parallel passages 115a and 115b, the branch passage 115a having a restricting orifice 319 therein. The other branch 115b may provide an unrestricted flow of fluid through ports 320 and 321 of timing valve 26 when the timing valve is positioned as shown. When the third to second shift valve 19 of Figure 3 is positioned for third speed operation, line pressure is admitted to passage 115 by way of ports 177 and 178 of the shift valve 19, this pressure being effective to apply the rear unit clutch. When the third to second speed shift valve is positioned for second speed operation, the passage 115 is connected to exhaust port 179 of the shift valve 19. To establish a forced downshift from third speed to second speed, the throttle valve 22 of Figure 2 is forced into the casing to admit line pressure from port 71 to passage 107 by way of port 72 of the throttle valve. This line pressure in passage 107 acts in chamber 157 (see Figure 3) of the third to second speed detent plug 154 forcing the detent plug 154 against spring 155 to admit pump line pressure from passage 107 to passage 113. Pressure in passage 113 is conducted to a chamber 315a (see Figure 6) at one end of the timing valve 26 forcing the timing valve against spring 317 and blocking off port 320 from port 321. In the application of the rear band, fluid pressure is exhausted from the rear unit servo 300 by way of passage 104, branch passage 104a, ports 42 and 41 of the manually operable valve 18, passage 115 leading to the port 178 and exhaust port 179 of the second to third speed shift valve 19. As explained, on a forced downshift from third to second speed, pressure acting in chamber 315a of the timing valve 26 causes valve 26 to block off port 320 from port 321 so that all fluid being exhausted from the rear band servo must pass through the restriction orifice 319 before it can get to the exhaust port 179 of the second to third speed shift valve 19. This restriction initially delays the rate at which fluid pressure may be exhausted from the rear unit servo. As the pressure is being exhausted from the rear unit band servo 300, pressure is being supplied to the front unit clutch servo 270 by way of ports 127a and 127b of the first to second speed shift valve 20 (see Figure 3), passage 112, ports 93 and 92 of the double transition valve 24 (see Figure 2) and passage 111. The latter passage 111 is also extended to a port 322 beneath land 316 of the timing valve 26. As the pressure builds up in the front unit clutch servo 231, this pressure acting on land 316 of the timing valve 26 moves the timing valve to connect ports 320 and 321 whereupon an unrestricted discharge of fluid from the rear unit servo may thereafter be directed to the exhaust port 179 of the second to third speed shift valve 19. Thus the timing valve 26 functions initially to delay the application of the rear unit band until the front unit clutch is first applied and thereafter is acted upon by pressure supplied to the front unit clutch to provide an unrestricted discharge of pressure fluid from the rear band servo to permit engagement of the rear band by the springs.

*Operation of the control system*

In describing the operation of the control system, it will be assumed that the vehicle is being started from a standing position and accelerated up through various speed ranges wherein progressive shifting of gear ratio in the transmission may be accomplished. With the vehicle in a standing position, all of the shift valves 19, 20 and 21 are initially positioned by the springs associated with the shift valves to their bottom or low speed selecting position wherein pressure delivery passage 115 of valve 19 is exhausted through port 179 of valve 19, pressure delivery passage 112 of valve 20 is exhausted to sump through port 127c of valve 20 and passage 127d and port 179 of valve 19, and delivery passage 110 of valve 21 is exhausted to sump through port 219 of valve 21. With the manually operable valve 18 positioned to select drive range-4, drive range-3, or low range condition of operation, the transmission will initially be conditioned for first speed operation wherein the front unit band and rear unit band are both applied. Fluid pressure from pump supply passage 17 is admitted to the front unit to apply the front band servo by way of ports 44 and 46 of the manually operable valve 18 and by way of passages 100, 116 and 116a, this pressure acting in chambers 246 and 249 to force the stem 242 of the front unit servo outwardly to apply the front unit band. The rear unit serve is applied through the action of the servo apply springs, the rear unit servo being exhausted to the transmission sump. The rear unit servo is exhausted by way of passage 104, ports 42 and 41 of the manually operable valve 18, passage 115, port 178 and exhaust port 179 of the second to third speed shift valve 19.

As the vehicle is accelerated, the governor pressure in passage 31 acting in chambers 139 and 139a of the first to second shift valve 20 will become effective at some vehicle speed to move the first to second speed shift valve 20 to its second speed position wherein land 126 blocks off exhaust port 127c and land 127 permits fluid pressure from line pressure supply passage 17 to be admitted through ports 127a and 127b to the first to second speed shift valve delivery passage 112. This pressure delivered by the shift valve 20 to passage 112 is conducted through ports 93 and 92 of the double transition valve 24 to passage 111 and to chambers 247 and 250 of the front unit band servo 240 to release the front unit band, and is conducted to the front unit clutch servo chamber 232 to apply the front unit clutch. The line pressure in passage 111 is also conducted to port 256a of the overrun control valve 27, moving the valve to a position wherein passage 116a is exhausted through the exhaust port 260 of the overrun control valve. The pressure acting in chambers 247 and 250 and the effect of spring 251 are effective to release the front band even though fluid pressure is still being supplied to chamber 246 beneath the piston 243 of the front unit band servo.

Upon a further increase in vehicle speed, governor pressure from governor delivery passage 32 supplied to chamber 150 beneath the governor plug 148 and governor pressure supplied from passage 31 to chamber 152 beneath governor plug 149 become effective at some vehicle speed to move the second to third speed shift valve 19 from its second speed position to its third speed position. With the shift valve 19 in its third speed position, land 147 blocks off exhaust port 179 and line pressure from passage 100a is admitted to passage 115 through ports 177 and 178 of the shift valve 19. Pressure supplied to passage 115 is conducted to the rear unit clutch servo chamber 238 to apply the rear unit clutch. The rear unit clutch apply pressure is conducted by passage 115 through ports 42 and 41 of the manually operable valve 18, through passage 104 to chamber 95a beneath the double transition valve 24 and through passage 104 to the rear unit servo chambers 311 and 308 to release the rear unit band. The pressure acting beneath the double transition valve 24 is effective to move the double transition valve 24 to connect passage 110 to passage 111 by way of ports 91 and 92 of the double transition valve 24. The passage 110, in turn, is connected to exhaust through ports 218 and 219 of the third to fourth speed shift valve 21. With chambers 247 and 250 of the front band servo connected to exhaust, line pressure supplied to chambers 246 and 249 of the front band servo through passage 100 is effective to apply the front unit band. With the front band and rear clutch applied, the transmission is in third speed gear ratio.

Upon a further increase in vehicle speed, the governor pressure from passage 31 acting in chamber 220 of the third to fourth speed shift valve 21 and the governor pressure from passage 32 and passage 222 acting in chamber 221 beneath the governor plug 202 will become effective to move the shift valve 21 from its third speed to its fourth speed position. Movement of the shift valve 21 to its fourth speed position admits line pressure from passage 106 to the third to fourth speed shift valve delivery passage 110 by way of ports 217 and 218. In this position the land 213 of the shift valve 21 blocks off exhaust port 219. It will be remembered that the double transition valve 24 was moved by pressure in chamber 95a when third speed was established so that the valve 24 admits pressure from passage 110 to passage 111 by way of ports 91 and 92 of valve 24, this pressure being effective to apply the front unit clutch and release the front unit band in the manner heretofore described in conjunction with the description of the establishment of second speed gear ratio. With the front clutch and rear clutch applied, the transmission is in fourth speed ratio.

With the manually operable valve 18 positioned for the third speed drive range of operation, the shift from first to second and second to third is established in the same manner as heretofore described. However, when the valve 18 is positioned in drive range-3, line pressure is admitted from line pressure supply passage 17 to passage 101 by way of ports 44 and 47 of the manually operable valve. This line pressure is conducted by passage 101 to a chamber 202a of the third to fourth speed shift valve governor plug 202 and is conducted by passage 101 to a chamber 215 intermediate the piston 201 and land 211 of the third to fourth speed shift valve 21. The governor plug 202 is made up of lands 202b and 202c having different areas so that pressure acting in chamber 202a is effective to partially counteract the effect of governor pressure acting in chamber 221 of the governor plug. The pressure in chamber 215 of the shift valve 21 forces the shift valve 21 to its third speed position and normally maintains the shift valve 21 in the third speed position irrespective of the normal tendency of the governor pressure to move the shift valve to its fourth speed position. As heretofore explained, with the manual valve 18 positioned in the third speed drive range position, the transmission will not normally upshift from third to fourth speed. However, when an excessive vehicle speed is obtained, such as, for example, 75 miles per hour, the third to fourth speed overcontrol valve 29 acted upon by governor pressure in passage 32 is moved to admit governor pressure from passage 31 to the chamber beneath the governor plug 221, this pressure being effective to upshift the third to fourth speed shift valve to its fourth speed position in order to protect the engine from continuous operation at excessive revolutions per minute.

With the manually operable valve 18 positioned for low range of operation, line pressure is admitted from pressure supply passage 17 to passage 102 by way of ports 44 and 48 of the manually operable valve, this line pressure from passage 102 being conducted to a chamber 182 adjacent the governor plug 148 of the second to third speed shift valve 19 and also being conducted by passage 102 to the end of the auxiliary rear unit of the servo exhaust valve 313. The pressure in chamber 182 of the governor plug 148 is effective to prevent upshifting of the second to third speed shift valve 19 from its second to third speed position irrespective of the action of governor pressure in chamber 150 beneath the governor plug 148 and governor pressure in chamber 152 beneath the governor plug 149. Thus with the manually operable valve 18 positioned to select low range of transmission operation, no higher gear ratio than second speed may be obtained irrespective of vehicle speed. The pressure acting upon the auxiliary rear unit servo exhaust valve 313 positions the valve to permit rapid exhaust of fluid pressure from chamber 308 of the rear unit servo so that the vehicle may be rocked out of a rut as heretofore explained.

With the manually operable valve 18 positioned for reverse condition of operation, pump line pressure from passage 17 is admitted to passage 103 by way of ports 44 and 49 of the manually operable valve 18, this passage conducting the fluid to the reverse cone brake piston chamber 292 to apply the reverse cone brake. The reverse brake apply pressure is also conducted by passage 103a to a port 86 of the compensator valve 23 and to a pressure control plug 262 associated with a control valve of the engine driven pump 10. The pressure conducted to port 86 of the compensator valve 23 is effective to move the compensator valve 23 so that land 76 of the compensator valve will uncover exhaust port 83, whereupon the compensator pressure is exhausted to the transmission sump. The front unit band servo is actuated by fluid pressure supplied to passage 100 by way of ports 44 and 46 of the manually operable valve 18, this pressure being effective in chambers 246 and 249 of the front unit servo 240 to apply the front unit band. With the front unit band and reverse cone brake applied, the transmission is conditioned for reverse operation.

With the manually operable valve 18 positioned for neutral, the pressure supply passage 17 is blocked off from the front band apply passage 100 by land 53 of the manually operable valve. Passage 100, in turn, is exhausted to sump through exhaust port 50 of valve 18. Line pressure, however, is supplied to the rear band servo to release the rear band by way of ports 42 and 41 of the manually operable valve 18 and through passage 104 to the chambers 311 and 308 of the rear band servo. With the front band and rear band released, the transmission is conditioned for neutral or no-drive operation.

There has been provided by this invention a control system for transmission having a planetary gearing unit adapted to provide a plurality of drive ratios in which several novel features are incorporated into the control of the gearing unit. These novel features include, but are not limited to: the structural arrangement whereby the front planetary gearing unit shift valve 21 is blocked in its third speed position when the valve 18 is placed for intermediate range of operation, the inclusion of the overcontrol valve 29 for upshifting the valve 21 at a predetermined vehicle speed irrespective of the sitting of valve 18, and the inclusion of overrun control valve 27 responsive to pressure supplied to the clutch chamber 272 for exhausting chamber 249 of the servo 240.

The preceding description recites the objects, advantages and useful results of the invention, and there is embodied therein a number of novel features in combination, which are subject to changes in specific arrangement and forms of structure without departing from the sipirit and scope of the invention as set forth in the appended claims.

I claim:

1. In a control system for a vehicle transmission, a fluid pressure source, means including a pressure actuated shift valve for controlling the drive ratio of said transmission, a vehicle speed responsive governor adapted to deliver fluid at variable pressure to first and second passages, an actuating chamber for said shift valve, and a hydraulically controlled valve member for alternately connecting said passages to said shift valve chamber.

2. In a control system for a vehicle transmission, a fluid pressure source, means including a pressure actuated shift valve for controlling the drive ratio of said transmission, a vehicle speed responsive governor adapted to deliver fluid at variable pressure to first and second passages, and actuating chamber for said shift valve, a valve member effective in one position to connect said chamber to said first governor delivery passage and effective in another position to connect said chamber to said second governor passage, and means yieldably biasing said valve to connect said first governor delivery passage to said chamber, said valve being responsive to governor pressure in said first passage and effective upon a predetermined rise in pressure in said first passage to connect said chamber to said second passage.

3. In a control system for a vehicle transmission, a fluid pressure source, means including a hydraulically controlled shift valve for controlling the drive ratio of said transmission, a vehicle speed responsive governor adapted to deliver fluid at variable pressure to first and second governor delivery passages, a shift valve actuating chamber, and means normally connecting one of said governor delivery passages to said chamber, said means being responsive to pressure existing in one governor delivery passage to connect said chamber to the other of said governor delivery passages when the pressure of fluid in said one governor delivery passage exceeds a predetermined amount.

4. In a control system for a vehicle transmission, a fluid pressure source, means including a hydraulically controlled shift valve for controlling the drive ratio of said transmission, a vehicle speed responsive governor adapted to deliver fluid at variable pressure to first and second governor delivery passages, said governor being effective to generate pressure in the first governor delivery passages greater than in the second of said governor delivery passages, an actuating chamber for said shift valve, and valve means for normally connecting the second governor delivery passages to said chamber, said valve means being responsive to pressure in said second passage and effective to connect the first passage to said chamber when the fluid pressure in said second delivery passage exceeds a predetermined amount.

5. In a control system for a vehicle transmission, a fluid pressure source, means including a manually operable valve and a hydraulically controlled shift valve for controlling the drive ratio of said transmission, an actuating chamber associated with said shift valve, said manually operable valve being effective in one position to connect said chamber to said fluid pressure source and effective in a second position to exhaust the chamber, a second actuating chamber associated with said shift valve, a vehicle speed responsive governor adapted to deliver fluid at variable pressure to a pair of governor delivery passages, and valve means effective in one position to connect one of said governor delivery passages to said second chamber and effective in a second position to connect the other of said governor delivery passages to said second chamber.

6. In a control system for a vehicle transmission, a fluid pressure source, means including a manually operable valve and a hydraulically actuated shift valve for controlling the drive ratio of said transmission, an actuating chamber associated with said shift valve, said manually operable valve being effective in one position to connect said actuating chamber to said fluid pressure source and effective in a second position to exhaust the chamber, the pressure of said source being effective to maintain said shift valve in a given gear ratio selecting position, a vehicle speed responsive governor effective to deliver fluid at variable pressure to first and second governor delivery passages, said governor being effective to generate pressure in said first governor delivery passage greater than in said second governor delivery passage, a second actuating chamber associated with said shift valve, and valve means for alternately connecting said second and first governor delivery passages to said second chamber, said valve means being responsve to pressure in said second governor delivery passage to connect said second chamber to said first governor delivery passage when the pressure in said second passage exceeds a predetermined amount.

7. In a control system for a vehicle transmission having a planetary gearing unit means including a pair of selectively operable fluid pressure responsive servo members adapted to establish different drive ratios through said gearing unit, a pair of pistons in one of said servo units, a control chamber associated with each of said pistons, respectively, a piston in said other servo member, a control chamber associated with said last-mentioned piston, a fluid pressure source, means for controlling the gear ratio of said gearing unit including a manually operable valve and a hydraulically controlled shift valve, said manually operable valve being effective in one position to direct fluid pressure from said source to both of said control chambers of said one servo unit, said shift valve being effective in one position to connect the control chamber of said other unit to said fluid pressure source and effective in a second position to connect said fluid pressure chamber to exhaust, and valve means responsive to fluid pressure delivered to said last-mentioned servo unit control chamber to connect one of said first servo unit control chambers to exhaust.

8. In a control system for a vehicle transmission having a planetary gearing unit, brake and clutch means adapted to establish a different drive ratio, a first servo unit operable to establish one drive ratio, a second servo unit operable to establish a second drive ratio, a pair of pistons in said first servo unit, a control chamber associated with each of said pistons, a fluid pressure source, a manually operable valve effective in one position to connect both of said control chambers to said fluid pressure source, a second control chamber associated with each of said pistons, a piston in said second servo unit, a control chamber associated with said second servo unit piston, a shift valve effective in one position to connect the second-mentioned control chambers of said first servo unit and the control chamber of said second servo unit to said fluid pressure source, and a valve responsive to pressure directed to said second-mentioned servo unit control chamber for connecting one of said first unit control chambers to exhaust.

9. In a control system for a vehicle transmission having a planetary gearing unit, brake and clutch means adapted to establish different drive ratios, a first servo unit operable to establish one drive ratio, a second servo unit operable to establish a second drive ratio, a pair of pistons in said first servo unit, control chambers associated with each of said pistons, respectively, a passage connecting said control chambers, a valve in said passage effective in one position to connect said chambers to each other and effective in a second position to connect one of said chambers to exhaust, additional control chambers associated with said pistons, respectively, a fluid pressure source, a manually operable valve effective to connect one of said first-mentioned control chambers to said fluid pressure source, a piston and a control chamber in said second servo unit, a shift valve effective in one position to connect said first servo unit additional control chambers, said first-mentioned valve and the control chamber of said second servo unit to said fluid pressure source, said first-mentioned valve being responsive to fluid pressure supplied to said second servo unit control chamber to block off said first-mentioned servo unit control chambers from each other and to connect one of said first-mentioned servo unit control chambers to exhaust.

10. In a control system for a vehicle transmission having a planetary gearing unit, brake and clutch means adapted to establish different drive ratios, a fluid pressure responsive servo unit operable to establish one drive ratio, a fluid pressure responsive servo unit operable to establish a second drive ratio, a pair of control chambers in said first servo unit, a valve effective in one position to connect said control chambers in series and effective in a second position to connect one of said control chambers to exhaust, a fluid pressure source, a manually operable valve for connecting one of said control chambers to said fluid pressure source, an additional pair of control chambers in said servo, a control chamber associated with the second-mentioned servo unit, a passage connecting said last-mentioned control chamber, one end of said first-mentioned valve, and said second-mentioned control chambers of said first servo unit in parallel, and a valve effective in one position to connect said last-mentioned passage to said fluid pressure source and effective in a second position to connect said last-mentioned passage to exhaust.

11. In a control system for a vehicle transmission, a source of fluid pressure, means including a manually operable selector valve and a hydraulically actuated shift valve for selecting the drive ratio of said transmission, a vehicle speed responsive governor adapted to deliver fluid at variable pressure to first and second governor delivery passages, an actuating chamber associated with said shift valve, valve means effective in one position to connect one of said governor delivery passages to said control chamber and effective in a second position to connect the other of said governor delivery passages to said control chamber, and a second actuating chamber associated with said shift valve, said manually operable selector valve being effective in one position to connect said second actuating control chamber to said fluid pressure source and effective in a second position to exhaust said last-mentioned chamber.

12. In a control system for a vehicle transmission a fluid pressure source, means including a manually operable valve and a hydraulically controlled shift valve for controlling the drive ratio of said transmission, a piston disposed in alignment with said shift valve, a stem member interposed between said piston and shift valve for maintaining said piston and shift valve in spaced relationship whereby a control chamber between said piston and shift valve is provided, said manually operable valve being effective in one position to connect said control chamber to said fluid pressure source and effective in a second position to exhaust said control chamber, a second control chamber associated with said shift valve, a vehicle speed responsive governor adapted to deliver a variable fluid pressure to first and second governor delivery passages, and valve means effective in one position to connect said second control chamber to one of said governor pressure delivery passages and effective in a second position to connect said second control chamber to the other of said governor pressure delivery passages.

13. In a control system for a vehicle transmission having a planetary gearing unit, means including a first fluid pressure responsive servo unit adapted to establish one drive ratio through said gearing unit, means including a second servo unit adapted to establish a second drive ratio through said gearing unit, first and second control chambers in said first servo member, a fluid pressure source, a manually operable valve effective in one position to connect one of said control chambers to said fluid pressure source, a passage connecting said first and second control chambers, a valve in said passage yieldably biased to admit pressure from said first chamber to said second chamber, third and fourth control chambers in said first servo unit, a control chamber in said second servo unit, a control chamber associated with said yieldably biased valve, a passage connecting said third and fourth control chambers, said second servo unit control chamber and said control chamber associated with said yieldably biased valve in parallel, a hydraulically controlled shift valve effective in one position to connect said last-mentioned passage to said fluid pressure source and effective in a second position to connect said passage to exhaust, said yieldably biased valve being responsive to pressure supplied to said last-mentioned passage to connect one of said first servo unit control chambers to exhaust, a vehicle speed responsive governor effective to deliver variable fluid pressure to first and second governor pressure delivery passages, respectively, a control chamber associated with said shift valve, valve means yieldably biased to connect one of said governor pressure delivery passages to said shift valve control chamber, said valve being responsive to pressure delivered to said one governor pressure delivery passage and movable to connect said shift valve control chamber to the other of said governor pressure delivery passages.

14. The combination as stated in claim 13 including a second control chamber associated with said hydraulically actuated shift valve and a passage connecting said second control chamber to said manually operable valve, said manually operable valve being effective in one position to connect said second shift valve control chamber to said fluid pressure source and effective in a second position to connect said second shift valve control chamber to said exhaust.

15. In a control system for a vehicle transmission a fluid pressure source, means including a hydraulically controlled shift valve for controlling the drive ratio of said transmission, a vehicle speed responsive governor adapted to deliver fluid at variable pressure to first and second governor delivery passages, the pressure generated in one of said governor delivery passages being greater than in the other, an actuating chamber for said shift valve, and a fluid pressure controlled valve for alternately connecting said chamber to one or the other of said governor delivery passages.

16. In a control system for a transmisison for a vehicle having an engine and having means for connecting the engine to drive the vehicle through a high speed ratio in the transmission or through a low speed ratio, the combination of a shiftable selecting member for selecting the ratios, means for urging the selecting member in the direction to select the high ratio with a first force, which is a function of vehicle speed, means for urging the selecting member in the direction to select low ratio with a second force which is a function of the torque demand on the engine, manually operable means for urging the selecting member in the direction to select low ratio with a third force, and additional valve means responsive to a predetermined vehicle speed for delivering fluid under pressure to said ratio selecting member for counteracting the third force.

17. In a control system for a transmission for a vehicle having an engine and having means for connecting the engine to drive the vehicle through a high speed ratio in the transmission or through a low speed ratio, the combination of a shiftable selecting member for selecting the ratios, a first expansible chamber motor for urging the member in the direction to select high speed, a second expansible chamber motor for urging the member in the direction to select low speed, means for urging the member in the direction to select low speed with a force which is a function of the torque demand on the engine, means for delivering to the first expansible chamber motor fluid under pressure which is a function of vehicle speed, manually operable means for delivering to the second expansible chamber motor fluid under pressure, and means responsive to a predetermined vehicle speed for increasing the pressure in the first expansible chamber motor to counteract the force of the second expansible chamber motor.

18. In a control system for a transmission for a vehicle having an engine and having means for connecting the engine to drive the vehicle through a high speed ratio in the transmission or through a low speed ratio, the combination of a shiftable selecting member for selecting the ratios, a first expansible chamber motor for urging the member in the direction to select high speed, a second expansible chamber motor for urging the member in the direction to select low speed, means for urging the member in the direction to select low speed with a force which is a function of the torque demand on the engine, first means for generating a fluid pressure which is a function of vehicle speed, means normally connecting said fluid pressure generating means to the first expansible chamber motor, manually operable means for delivering to the second expansible chamber motor fluid under pressure, second means for generating a fluid pressure which is a function of vehicle speed and is greater than the pressure of the first generating means, and means responsive to a predetermined vehicle speed for connecting the second fluid pressure generating means to the first expansible chamber motor.

19. In a transmission control system a drive train adapted to be selectively established in different driving conditions including connection at one speed ratio and disconnection of said one speed ratio, a movable member adapted in one position to establish one of said conditions and adapted in another position to establish another of said conditions, first and second expansible chamber motors both adapted to urge the member in one direction, a third expansible chamber motor adapted to urge the member in the opposite direction, means for admitting fluid under pressure to the chambers of the first and second expansible chamber motors to move the member in one direction, means for admitting fluid under pressure to the chamber of the third expansible chamber motor to urge the member in the opposite direction, and means responsive to the pressure of fluid under pressure in the chamber of said third expansible chamber motor for interrupting the supply of fluid to the chamber of the second expansible chamber motor and for venting the chamber of said second expansible chamber motor.

20. In a transmission control system a drive train adapted to be selectively established in different driving conditions including connection at one speed ratio and disconnection of said one speed ratio, a movable member adapted in one position to establish one of said conditions and adapted in another position to establish another of said conditions, first and second expansible chamber motors both adapted to urge the member in one direction, a third expansible chamber motor adapted to urge the member in the opposite direction, resilient means constantly urging the member in said opposite direction, means for admitting fluid under pressure to the chambers of the first and second expansible chamber motors to move the member in one direction against the force of said resilient means, means for admitting fluid under pressure to the chamber of the third expansible chamber motor to urge the member in the opposite direction, and means responsive to the presence of fluid under pressure in the chamber of said third expansible chamber motor for interrupting the supply of fluid to the chamber of the second expansible chamber motor and for venting the chamber of said second expansible chamber motor.

21. In a transmission control system a drive train adapted to be selectively established in different driving conditions including connection at one speed ratio and disconnection of said one speed ratio, a movable member adapted in one position to establish one of said conditions and adapted in another position to establish another of said conditions, first and second expansible chamber motors both adapted to urge the member in one direction, a third expansible chamber motor adapted to urge the member in the opposite direction, means for admitting fluid under pressure to the chamber of the first expansible chamber motor, a passage connected to the chamber of the first expansible chamber motor communicating with the chamber of the second expansible chamber motor, means for admitting fluid under pressure to the chamber of the third expansible chamber motor, and means responsive to the presence of fluid under pressure in the chamber of the third expansible chamber motor for closing said passage and venting the chamber of the second expansible chamber motor.

22. In a control system for a transmission for an engine driven vehicle adapted to drive the vehicle in different transmission drive ratios, a fluid pressure controlled shift valve, a fluid pressure source, a speed responsive governor connected to said source and adapted to deliver a variable fluid pressure to said shift valve, means responsive to governor delivered pressure associated with said shift valve for positioning said shift valve to select a relatively high drive ratio in said transmission, means associated with said shift valve and responsive to torque demand on the engine for opposing the selection of said relatively high drive ratio, a drive range selector valve connected to said fluid pressure source, said drive range selector valve being effective in one operative position to deliver fluid under pressure from said source to said shift valve to prevent establishment of high ratio drive in said transmission by said shift valve, and additional valve means controlled by said governor and effective at a predetermined speed of rotation of said governor to deliver fluid under pressure to said shift valve to position said shift valve to select high ratio drive in the transmission irrespective of the position of said drive range selector valve.

References Cited in the file of this patent

UNITED STATES PATENTS

| | | |
|---|---|---|
| 2,204,872 | Thompson | June 18, 1940 |
| 2,516,203 | Greenlee et al. | July 25, 1950 |
| 2,516,208 | Hasbany | July 25, 1950 |
| 2,633,035 | Livermore | Mar. 31, 1953 |
| 2,640,373 | Jandasek | June 2, 1953 |
| 2,644,559 | Randol | July 7, 1953 |
| 2,667,085 | Ackerman | Jan. 26, 1954 |
| 2,694,948 | McFarland | Nov. 23, 1954 |
| 2,697,363 | Sheppard | Dec. 21, 1954 |
| 2,740,304 | Sheppard | Apr. 3, 1956 |